(12) United States Patent
Proctor et al.

(10) Patent No.: US 8,498,234 B2
(45) Date of Patent: Jul. 30, 2013

(54) WIRELESS LOCAL AREA NETWORK REPEATER

(75) Inventors: James A. Proctor, Melbourne Beach, FL (US); Kenneth M. Gainey, Satellite Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1700 days.

(21) Appl. No.: 10/516,327

(22) PCT Filed: Jun. 11, 2003

(86) PCT No.: PCT/US03/16208
§ 371 (c)(1), (2), (4) Date: Dec. 14, 2004

(87) PCT Pub. No.: WO04/002014
PCT Pub. Date: Dec. 31, 2003

(65) Prior Publication Data
US 2005/0286448 A1    Dec. 29, 2005

Related U.S. Application Data

(60) Provisional application No. 60/390,093, filed on Jun. 21, 2002.

(51) Int. Cl.
*H04B 7/10* (2006.01)
(52) U.S. Cl.
USPC .......................................... 370/315; 370/279
(58) Field of Classification Search
USPC ......... 370/343, 279, 315, 319, 466; 455/11.1, 455/15, 20, 17, 25, 76, 84, 552, 351, 426
See application file for complete search history.

(56) References Cited

U.S. PATENT DOCUMENTS 3,363,250 A * 1/1968 Jacobson ..................... 455/67.7
4,000,467 A   12/1976 Lentz et al.
(Continued)

FOREIGN PATENT DOCUMENTS

CA    2051283 A1   3/1992
CN    1137335 A    12/1996
(Continued)

OTHER PUBLICATIONS

First Report issued by IP Australia on Jul. 31, 2007 in connection with the corresponding Australian application No. 2003239577.
(Continued)

*Primary Examiner* — Andrew Lai
*Assistant Examiner* — Sumitra Ganguly (57) ABSTRACT

A repeater (200) facilitates wireless communication between a first communication device (100) and a second communication device (105) in a wireless network using a time division duplex protocol for data transmission. The repeater (200) includes a receiver (310, 315) for receiving a signal on either of at least two bi-directional communication frequencies simultaneously. A signal detector (362) is operatively coupled to the receiver (300, 310, 315) for determining if the signal is present on at least one of the two bi-directional frequencies. A frequency converter (320, 321, 323, 324, 360, 361) is for converting the signal present on one of the bi-directional frequencies to a converted signal on the other of the bi-directional frequencies. A transmitter (300, 325, 330, 335, 345, 350) is for transmitting the converted signal on the other of said bi-directional frequencies.

30 Claims, 4 Drawing Sheets

U.S. PATENT DOCUMENTS

| | | | |
|---|---|---|---|
| 4,001,691 A | 1/1977 | Gruenberg et al. | |
| 4,061,970 A | 12/1977 | Magneron et al. | |
| 4,081,752 A | 3/1978 | Sumi et al. | |
| 4,124,825 A | 11/1978 | Webb et al. | |
| 4,204,016 A | 5/1980 | Chavannes et al. | |
| 4,334,323 A | 6/1982 | Moore et al. | |
| 4,368,541 A | 1/1983 | Evans et al. | |
| 4,509,206 A | 4/1985 | Carpe et al. | |
| 4,679,243 A | 7/1987 | McGeehan et al. | |
| 4,701,935 A | 10/1987 | Namiki et al. | |
| 4,723,302 A | 2/1988 | Fulmer et al. | |
| 4,777,653 A | 10/1988 | Bonnerot et al. | |
| 4,783,843 A | 11/1988 | Leff et al. | |
| 4,820,568 A | 4/1989 | Harpell et al. | |
| 4,922,259 A | 5/1990 | Hall et al. | |
| 5,023,930 A | 6/1991 | Leslie et al. | |
| 5,095,528 A | 3/1992 | Leslie et al. | |
| 5,214,788 A | 5/1993 | Delaperriere et al. | |
| 5,220,562 A | 6/1993 | Takada et al. | |
| 5,280,480 A | 1/1994 | Pitt et al. | |
| 5,333,175 A | 7/1994 | Ariyavisitakul et al. | |
| 5,341,364 A | 8/1994 | Marra et al. | |
| 5,349,463 A | 9/1994 | Hirohashi et al. | |
| 5,368,897 A * | 11/1994 | Kurihara et al. | 427/450 |
| 5,371,734 A | 12/1994 | Fischer et al. | |
| 5,373,503 A | 12/1994 | Chen et al. | |
| 5,383,144 A | 1/1995 | Kato | |
| 5,408,197 A | 4/1995 | Miyake et al. | |
| 5,408,618 A | 4/1995 | Aho et al. | |
| 5,430,726 A | 7/1995 | Moorwood et al. | |
| 5,446,770 A * | 8/1995 | Urabe et al. | 375/219 |
| 5,465,251 A | 11/1995 | Judd et al. | |
| 5,471,642 A | 11/1995 | Palmer et al. | |
| 5,485,486 A | 1/1996 | Gilhousen et al. | |
| 5,509,028 A | 4/1996 | Marque-Pucheu et al. | |
| 5,515,376 A | 5/1996 | Murthy et al. | |
| 5,519,619 A * | 5/1996 | Seda | 701/201 |
| 5,608,755 A | 3/1997 | Rakib et al. | |
| 5,610,916 A | 3/1997 | Kostreski et al. | |
| 5,648,984 A | 7/1997 | Kroninger et al. | |
| 5,654,979 A | 8/1997 | Levin et al. | |
| 5,659,879 A | 8/1997 | Dupuy et al. | |
| 5,678,177 A * | 10/1997 | Beasley | 455/16 |
| 5,678,198 A | 10/1997 | Lemson et al. | |
| 5,684,801 A | 11/1997 | Amitay et al. | |
| 5,697,052 A | 12/1997 | Treatch et al. | |
| 5,726,980 A | 3/1998 | Rickard et al. | |
| 5,732,334 A | 3/1998 | Miyake et al. | |
| 5,745,846 A | 4/1998 | Myer et al. | |
| 5,754,540 A | 5/1998 | Liu et al. | |
| 5,764,636 A | 6/1998 | Edsall | |
| 5,767,788 A | 6/1998 | Ness | |
| 5,771,174 A | 6/1998 | Spinner et al. | |
| 5,784,683 A | 7/1998 | Sistanizadeh et al. | |
| 5,794,145 A * | 8/1998 | Milam | 455/426.1 |
| 5,812,933 A | 9/1998 | Niki | |
| 5,815,795 A | 9/1998 | Iwai et al. | |
| 5,825,809 A | 10/1998 | Sim | |
| 5,852,629 A | 12/1998 | Iwamatsu et al. | |
| 5,857,144 A | 1/1999 | Mangum et al. | |
| 5,862,207 A * | 1/1999 | Aoshima | 379/201.05 |
| 5,875,179 A | 2/1999 | Tikalsky | |
| 5,883,884 A * | 3/1999 | Atkinson | 370/279 |
| 5,884,181 A | 3/1999 | Arnold et al. | |
| 5,890,055 A | 3/1999 | Chu et al. | |
| 5,903,553 A | 5/1999 | Sakamoto et al. | |
| 5,907,794 A | 5/1999 | Lehmusto et al. | |
| 5,963,846 A | 10/1999 | Kurby et al. | |
| 5,963,847 A | 10/1999 | Ito et al. | |
| 5,987,304 A | 11/1999 | Latt et al. | |
| 6,005,855 A | 12/1999 | Zehavi et al. | |
| 6,005,884 A | 12/1999 | Cook et al. | |
| 6,014,380 A | 1/2000 | Hendol et al. | |
| 6,032,194 A | 2/2000 | Gai et al. | |
| 6,061,548 A | 5/2000 | Reudink et al. | |
| 6,088,570 A | 7/2000 | Komara et al. | |
| 6,101,400 A | 8/2000 | Ogaz et al. | |
| 6,108,364 A | 8/2000 | Weaver, Jr. et al. | |
| 6,128,512 A | 10/2000 | Trompower et al. | |
| 6,128,729 A | 10/2000 | Kimball et al. | |
| 6,141,335 A | 10/2000 | Kuwahara et al. | |
| 6,163,276 A | 12/2000 | Irving et al. | |
| 6,188,694 B1 | 2/2001 | Fine et al. | |
| 6,188,719 B1 | 2/2001 | Collomby et al. | |
| 6,195,051 B1 | 2/2001 | McCoy et al. | |
| 6,202,114 B1 | 3/2001 | Dutt et al. | |
| 6,215,982 B1 | 4/2001 | Trompower | |
| 6,219,739 B1 | 4/2001 | Dutt et al. | |
| 6,222,503 B1 | 4/2001 | Gietema et al. | |
| 6,272,351 B1 | 8/2001 | Langston et al. | |
| 6,285,863 B1 | 9/2001 | Zhang et al. | |
| 6,298,061 B1 | 10/2001 | Chin et al. | |
| 6,304,563 B1 | 10/2001 | Blessent et al. | |
| 6,304,575 B1 | 10/2001 | Carroll et al. | |
| 6,331,792 B1 | 12/2001 | Tonietto et al. | |
| 6,339,694 B1 | 1/2002 | Komara et al. | |
| 6,342,777 B1 | 1/2002 | Takahashi et al. | |
| 6,363,068 B1 | 3/2002 | Kinoshita | |
| 6,370,185 B1 | 4/2002 | Schmutz et al. | |
| 6,370,369 B1 | 4/2002 | Kraiem et al. | |
| 6,377,612 B1 | 4/2002 | Baker et al. | |
| 6,377,640 B2 | 4/2002 | Trans et al. | |
| 6,384,765 B1 * | 5/2002 | Sjostrand et al. | 342/15 |
| 6,385,181 B1 | 5/2002 | Tsutsui et al. | |
| 6,388,995 B1 | 5/2002 | Gai et al. | |
| 6,393,299 B1 * | 5/2002 | Mizumoto et al. | 455/552.1 |
| 6,404,775 B1 * | 6/2002 | Leslie et al. | 370/466 |
| 6,441,781 B1 | 8/2002 | Rog et al. | |
| 6,473,131 B1 | 10/2002 | Neugebauer et al. | |
| 6,480,481 B1 | 11/2002 | Park et al. | |
| 6,498,804 B1 | 12/2002 | Ide et al. | |
| 6,501,955 B1 | 12/2002 | Durrant et al. | |
| 6,516,438 B1 | 2/2003 | Wilcoxson et al. | |
| 6,535,732 B1 | 3/2003 | McIntosh et al. | |
| 6,539,028 B1 | 3/2003 | Soh et al. | |
| 6,539,204 B1 | 3/2003 | Marsh et al. | |
| 6,549,542 B1 | 4/2003 | Dong et al. | |
| 6,549,567 B1 | 4/2003 | Fullerton et al. | |
| 6,563,468 B2 | 5/2003 | Hill et al. | |
| 6,574,198 B1 | 6/2003 | Petersson et al. | |
| 6,628,624 B1 | 9/2003 | Mahajan et al. | |
| 6,664,932 B2 | 12/2003 | Sabet et al. | |
| 6,671,502 B1 | 12/2003 | Ogawa et al. | |
| 6,684,058 B1 | 1/2004 | Karacaoglu et al. | |
| 6,690,657 B1 * | 2/2004 | Lau et al. | 370/315 |
| 6,694,125 B2 | 2/2004 | White et al. | |
| 6,718,160 B2 | 4/2004 | Schmutz | |
| 6,728,541 B2 | 4/2004 | Ohkura et al. | |
| 6,766,113 B1 | 7/2004 | Al-Salameh et al. | |
| 6,781,544 B2 | 8/2004 | Saliga et al. | |
| 6,788,256 B2 | 9/2004 | Hollister | |
| 6,880,103 B2 | 4/2005 | Kim et al. | |
| 6,888,809 B1 | 5/2005 | Foschini et al. | |
| 6,888,881 B1 | 5/2005 | Nagano | |
| 6,904,266 B1 * | 6/2005 | Jin et al. | 455/20 |
| 6,906,669 B2 | 6/2005 | Sabet et al. | |
| 6,934,511 B1 | 8/2005 | Lovinggood et al. | |
| 6,934,555 B2 | 8/2005 | Silva et al. | |
| 6,944,139 B1 | 9/2005 | Campanella | |
| 6,957,042 B2 | 10/2005 | Williams et al. | |
| 6,965,568 B1 | 11/2005 | Larsen | |
| 6,983,162 B2 | 1/2006 | Garani et al. | |
| 6,985,516 B1 | 1/2006 | Easton et al. | |
| 6,990,313 B1 | 1/2006 | Yarkosky et al. | |
| 7,027,418 B2 | 4/2006 | Gan et al. | |
| 7,027,770 B2 | 4/2006 | Judd et al. | |
| 7,043,203 B2 | 5/2006 | Miquel et al. | |
| 7,050,442 B1 | 5/2006 | Proctor et al. | |
| 7,050,452 B2 | 5/2006 | Sugar et al. | |
| 7,058,071 B1 | 6/2006 | Myles et al. | |
| 7,058,368 B2 | 6/2006 | Nicholls et al. | |
| 7,065,036 B1 | 6/2006 | Ryan | |
| 7,088,734 B2 | 8/2006 | Newberg et al. | |
| 7,103,344 B2 | 9/2006 | Menard et al. | |
| 7,120,930 B2 | 10/2006 | Mauter et al. | |
| 7,123,670 B2 | 10/2006 | Gilbert et al. | |
| 7,123,676 B2 | 10/2006 | Gebara et al. | |

| | | |
|---|---|---|
| 7,132,988 B2 | 11/2006 | Yegin et al. |
| 7,133,391 B2 | 11/2006 | Belcea et al. |
| 7,133,460 B2 | 11/2006 | Bae et al. |
| 7,139,527 B2 | 11/2006 | Tamaki et al. |
| 7,167,526 B2 | 1/2007 | Liang et al. |
| 7,187,904 B2 | 3/2007 | Gainey et al. |
| 7,193,975 B2 | 3/2007 | Tsutsumi et al. |
| 7,194,275 B2 | 3/2007 | Bolin et al. |
| 7,200,134 B2 | 4/2007 | Proctor, Jr. et al. |
| 7,215,964 B2 | 5/2007 | Miyake et al. |
| 7,233,771 B2 | 6/2007 | Proctor, Jr. et al. |
| 7,248,645 B2 | 7/2007 | Vialle et al. |
| 7,254,132 B2 | 8/2007 | Takao et al. |
| 7,299,005 B1 | 11/2007 | Yarkosky et al. |
| 7,315,573 B2 | 1/2008 | Lusky et al. |
| 7,319,714 B2 | 1/2008 | Sakata et al. |
| 7,321,787 B2 | 1/2008 | Kim et al. |
| 7,339,926 B2 | 3/2008 | Stanwood et al. |
| 7,352,696 B2 | 4/2008 | Stephens et al. |
| 7,406,060 B2 | 7/2008 | Periyalwar et al. |
| 7,409,186 B2 | 8/2008 | Van Buren et al. |
| 7,430,397 B2 | 9/2008 | Suda et al. |
| 7,450,936 B2 | 11/2008 | Kim et al. |
| 7,457,587 B2 | 11/2008 | Chung |
| 7,463,200 B2 | 12/2008 | Gainey et al. |
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal et al. |
| 7,676,194 B2 | 3/2010 | Rappaport et al. |
| 7,729,669 B2 | 6/2010 | Van Buren et al. |
| 8,023,885 B2 | 9/2011 | Proctor, Jr. et al. |
| 8,027,642 B2 | 9/2011 | Proctor, Jr. et al. |
| 8,059,727 B2 | 11/2011 | Proctor, Jr. et al. |
| 8,078,100 B2 | 12/2011 | Proctor, Jr. et al. |
| 2001/0028638 A1 | 10/2001 | Walton et al. |
| 2001/0031646 A1 | 10/2001 | Williams et al. |
| 2001/0040699 A1 | 11/2001 | Osawa et al. |
| 2001/0050580 A1 | 12/2001 | O'toole et al. |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018479 A1 | 2/2002 | Kikkawa et al. |
| 2002/0018487 A1 | 2/2002 | Chen et al. |
| 2002/0034958 A1 | 3/2002 | Oberschmidt et al. |
| 2002/0045461 A1 | 4/2002 | Bongfeldt et al. |
| 2002/0061031 A1* | 5/2002 | Sugar et al. ............ 370/466 |
| 2002/0072853 A1 | 6/2002 | Sullivan |
| 2002/0089945 A1 | 7/2002 | Belcea et al. |
| 2002/0101843 A1 | 8/2002 | Sheng et al. |
| 2002/0102948 A1 | 8/2002 | Stanwood et al. |
| 2002/0109585 A1 | 8/2002 | Sanderson et al. |
| 2002/0115409 A1 | 8/2002 | Khayrallah et al. |
| 2002/0119783 A1 | 8/2002 | Bourlas et al. |
| 2002/0136268 A1 | 9/2002 | Gan et al. |
| 2002/0141435 A1 | 10/2002 | Newberg et al. |
| 2002/0146026 A1 | 10/2002 | Unitt et al. |
| 2002/0155838 A1 | 10/2002 | Durrant et al. |
| 2002/0159506 A1 | 10/2002 | Alamouti et al. |
| 2002/0163902 A1 | 11/2002 | Takao et al. |
| 2002/0177401 A1* | 11/2002 | Judd et al. ............ 455/11.1 |
| 2003/0008669 A1 | 1/2003 | Stein et al. |
| 2003/0026363 A1 | 2/2003 | Stoter et al. |
| 2003/0063583 A1 | 4/2003 | Padovani et al. |
| 2003/0139175 A1 | 7/2003 | Kim et al. |
| 2003/0148736 A1 | 8/2003 | Wright et al. |
| 2003/0179734 A1 | 9/2003 | Tsutsumi et al. |
| 2003/0185163 A1 | 10/2003 | Bertonis et al. |
| 2003/0211828 A1 | 11/2003 | Dalgleish et al. |
| 2003/0235170 A1 | 12/2003 | Trainin et al. |
| 2003/0236069 A1 | 12/2003 | Sakata et al. |
| 2004/0001464 A1 | 1/2004 | Adkins et al. |
| 2004/0029537 A1 | 2/2004 | Pugel et al. |
| 2004/0038707 A1 | 2/2004 | Kim et al. |
| 2004/0047333 A1 | 3/2004 | Han et al. |
| 2004/0047335 A1 | 3/2004 | Proctor, Jr. et al. |
| 2004/0110469 A1 | 6/2004 | Judd et al. |
| 2004/0121648 A1 | 6/2004 | Voros |
| 2004/0131025 A1 | 7/2004 | Dohler et al. |
| 2004/0146013 A1 | 7/2004 | Song et al. |
| 2004/0157551 A1 | 8/2004 | Gainey et al. |
| 2004/0166802 A1 | 8/2004 | McKay, Sr. et al. |
| 2004/0176050 A1 | 9/2004 | Steer et al. |
| 2004/0198295 A1 | 10/2004 | Nicholls et al. |
| 2004/0208258 A1 | 10/2004 | Lozano et al. |
| 2004/0218683 A1 | 11/2004 | Batra et al. |
| 2004/0229563 A1 | 11/2004 | Fitton et al. |
| 2004/0235417 A1 | 11/2004 | Dean |
| 2004/0240426 A1 | 12/2004 | Wu et al. |
| 2004/0248581 A1 | 12/2004 | Seki et al. |
| 2004/0264511 A1 | 12/2004 | Futch et al. |
| 2005/0014464 A1 | 1/2005 | Larsson et al. |
| 2005/0030891 A1 | 2/2005 | Stephens et al. |
| 2005/0042999 A1 | 2/2005 | Rappaport et al. |
| 2005/0130587 A1 | 6/2005 | Suda et al. |
| 2005/0190822 A1 | 9/2005 | Fujii et al. |
| 2005/0201315 A1 | 9/2005 | Lakkis et al. |
| 2005/0254442 A1 | 11/2005 | Proctor, Jr. et al. |
| 2005/0256963 A1 | 11/2005 | Proctor, Jr. et al. |
| 2006/0028388 A1 | 2/2006 | Schantz |
| 2006/0035643 A1 | 2/2006 | Vook et al. |
| 2006/0041680 A1 | 2/2006 | Proctor, Jr. et al. |
| 2006/0045193 A1 | 3/2006 | Stolpman et al. |
| 2006/0052066 A1 | 3/2006 | Cleveland et al. |
| 2006/0052099 A1 | 3/2006 | Parker et al. |
| 2006/0056352 A1 | 3/2006 | Proctor et al. |
| 2006/0063484 A1 | 3/2006 | Proctor et al. |
| 2006/0063485 A1 | 3/2006 | Gainey et al. |
| 2006/0067277 A1 | 3/2006 | Thomas et al. |
| 2006/0072682 A1 | 4/2006 | Kent et al. |
| 2006/0098592 A1 | 5/2006 | Proctor, Jr. et al. |
| 2006/0183421 A1 | 8/2006 | Proctor et al. |
| 2006/0203757 A1 | 9/2006 | Young et al. |
| 2006/0262026 A1 | 11/2006 | Gainey et al. |
| 2007/0025349 A1 | 2/2007 | Bajic et al. |
| 2007/0025486 A1 | 2/2007 | Gainey et al. |
| 2007/0032192 A1 | 2/2007 | Gainey et al. |
| 2007/0121546 A1 | 5/2007 | Zuckerman et al. |
| 2007/0237181 A1 | 10/2007 | Cho et al. |
| 2007/0268846 A1 | 11/2007 | Proctor, Jr. et al. |
| 2007/0286110 A1 | 12/2007 | Proctor, Jr. et al. |
| 2008/0057862 A1 | 3/2008 | Smith et al. |
| 2008/0232438 A1 | 9/2008 | Dai et al. |
| 2008/0233942 A9 | 9/2008 | Kim et al. |
| 2008/0267156 A1 | 10/2008 | Gubeskys et al. |
| 2009/0135745 A1 | 5/2009 | Gainey et al. |
| 2009/0190684 A1 | 7/2009 | She et al. |
| 2009/0290526 A1 | 11/2009 | Gainey et al. |
| 2009/0323582 A1 | 12/2009 | Proctor, Jr. et al. |
| 2010/0002620 A1 | 1/2010 | Proctor, Jr. et al. |

FOREIGN PATENT DOCUMENTS

| | | |
|---|---|---|
| CN | 1186401 | 7/1998 |
| CN | 1256032 A | 6/2000 |
| CN | 1663149 | 8/2005 |
| CN | 1706117 A | 12/2005 |
| EP | 0523687 A2 | 1/1993 |
| EP | 0709973 A1 | 5/1996 |
| EP | 0715423 | 6/1996 |
| EP | 0847146 | 6/1998 |
| EP | 0853393 A1 | 7/1998 |
| EP | 0860953 A1 | 8/1998 |
| EP | 1548526 A2 | 6/2005 |
| EP | 1615354 A2 | 1/2006 |
| GB | 2272599 A | 5/1994 |
| GB | 2351420 | 12/2002 |
| JP | 62040895 | 2/1987 |
| JP | 63-160442 | 7/1988 |
| JP | 64011428 | 1/1989 |
| JP | 02100358 | 4/1990 |
| JP | 03021884 | 1/1991 |
| JP | 05063623 | 3/1993 |
| JP | 05102907 | 4/1993 |
| JP | 06013947 | 1/1994 |
| JP | 06334577 | 12/1994 |
| JP | 07030473 | 1/1995 |
| JP | 7079187 A | 3/1995 |
| JP | 07079205 | 3/1995 |

| | | |
|---|---|---|
| JP | 07131401 | 5/1995 |
| JP | 8097762 A | 4/1996 |
| JP | 8274683 A | 10/1996 |
| JP | 08274706 | 10/1996 |
| JP | 09-018484 | 1/1997 |
| JP | 09130322 | 5/1997 |
| JP | 09162801 | 6/1997 |
| JP | 9162903 A | 6/1997 |
| JP | 09182115 | 7/1997 |
| JP | 09214418 | 8/1997 |
| JP | 10032557 A | 2/1998 |
| JP | 10107727 | 4/1998 |
| JP | 10135892 | 5/1998 |
| JP | 10242932 A | 9/1998 |
| JP | 11055713 | 2/1999 |
| JP | 11127104 | 5/1999 |
| JP | 11298421 | 10/1999 |
| JP | 2000031877 | 1/2000 |
| JP | 2000502218 | 2/2000 |
| JP | 2000082983 | 3/2000 |
| JP | 2000509536 A | 7/2000 |
| JP | 2000236290 | 8/2000 |
| JP | 2000269873 | 9/2000 |
| JP | 2001016152 | 1/2001 |
| JP | 2001111575 | 4/2001 |
| JP | 2001136115 | 5/2001 |
| JP | 2001244864 A | 9/2001 |
| JP | 2001357480 A | 12/2001 |
| JP | 2002033691 | 1/2002 |
| JP | 2002111571 | 4/2002 |
| JP | 2002223188 A | 8/2002 |
| JP | 2002271255 | 9/2002 |
| JP | 2002281042 A | 9/2002 |
| JP | 2003174394 | 6/2003 |
| JP | 2003198442 | 7/2003 |
| JP | 2003244050 | 8/2003 |
| JP | 2004056210 | 2/2004 |
| JP | 2004328666 | 11/2004 |
| JP | 2004538682 T | 12/2004 |
| JP | 2005072646 | 3/2005 |
| JP | 2005110150 | 4/2005 |
| JP | 2005191691 A | 7/2005 |
| JP | 2005236626 | 9/2005 |
| JP | 2005252692 A | 9/2005 |
| JP | 2005295499 A | 10/2005 |
| JP | 2005531202 | 10/2005 |
| JP | 2005531265 | 10/2005 |
| JP | 2006503481 | 1/2006 |
| JP | 2006505146 | 2/2006 |
| JP | 2006167488 A | 7/2006 |
| JP | 2007528147 A | 10/2007 |
| KR | 19980063664 | 10/1998 |
| KR | 1020040004261 A | 1/2004 |
| KR | 100610929 | 8/2006 |
| RU | 2120702 C1 | 10/1998 |
| RU | 2233045 C2 | 7/2004 |
| RU | 2242086 C2 | 12/2004 |
| RU | 2249916 C2 | 4/2005 |
| RU | 2264036 | 11/2005 |
| WO | WO9214339 | 8/1992 |
| WO | 9505037 A1 | 2/1995 |
| WO | WO9622636 A1 | 7/1996 |
| WO | WO9715991 | 5/1997 |
| WO | WO9734434 | 9/1997 |
| WO | WO9852365 | 11/1998 |
| WO | WO9858461 | 12/1998 |
| WO | WO9923844 | 5/1999 |
| WO | WO9959264 | 11/1999 |
| WO | WO0050971 A2 | 8/2000 |
| WO | WO0152447 | 7/2001 |
| WO | WO0176098 A2 | 10/2001 |
| WO | WO0182512 | 11/2001 |
| WO | WO0199308 | 12/2001 |
| WO | WO0208857 A2 | 1/2002 |
| WO | WO0217572 A2 | 2/2002 |
| WO | WO03013005 | 2/2003 |
| WO | WO04002014 A1 | 12/2003 |
| WO | WO2004001892 | 12/2003 |
| WO | WO2004001986 | 12/2003 |
| WO | WO2004004365 | 1/2004 |
| WO | WO2004032362 | 4/2004 |
| WO | WO2004036789 | 4/2004 |
| WO | WO2004038958 | 5/2004 |
| WO | 2004047308 | 6/2004 |
| WO | WO2004062305 A1 | 7/2004 |
| WO | WO2004107693 A1 | 12/2004 |
| WO | 2005050918 A2 | 6/2005 |
| WO | WO2005069249 A1 | 7/2005 |
| WO | WO2005069656 A1 | 7/2005 |
| WO | WO2005115022 | 12/2005 |

OTHER PUBLICATIONS

Office communication dated Oct. 19, 2006 issued from the Mexican Patent Office for counterpart application No. PA/a/2004/011588.
Mexican Office communication dated Jul. 2, 2007 issued from the Mexican Patent Office for application PA/a/2004/011588 with partial translation thereof.
Office communication dated Jan. 12, 2007 issued from the European Patent Office for counterpart application No. 03 734 139.9-1246.
Office Action issued from the Mexican Patent Office dated Feb. 22, 2008 in connection with the corresponding Mexican Patent Application No. PA/a/2004/011588.
Supplementary European Search Report—EP08004269, Search Authority—The Hague, Apr. 15, 2008.
European Search Opinion—EP08004269, Search Authority—The Hague, Apr. 15, 2008.
Andrisano, et al., On the Spectral Efficiency of CPM Systems over Real Channel in The Presence of Adjacent Channel and CoChannel Interference: A Camparison between Partial and Full Response Systems, IEEE Transactions on Vehicular Technology, vol. 39, No. 2, May 1990.
Code of Federal Regulations, Title 47 Telecommunication; "Federal Communications Commission code part 15.407." Federal Communications Commission vol. 1, chapter 1. part 15.407.
First Office Action issued from the Chinese Patent Office in connection with corresponding Chinese application No. 200380101286.2.
Draft Corrigendum to IEEE Standard for Local and Metropolitan Area Networks—Part 16: Air Interface for Fixed Broadband Wireless Access Systems, IEEE P802.16-2004/Cor1/D5.
Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands.
IEEE 802.16(e), Part 16: Air Interface for Fixed Broadband Wireless Access Systems. 2005, Sections 8.4.10.2.1, 8.4.10.3.2.
IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7 3.2.4; Paragraphs 15.4.6.2 and 18.4.6.2.
IEEE Std 802.11b-1999. "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.
IEEE Std 802.11g-2003. "Part 11: Wireless LAN Medium Access Control (MAC) and Physical Layer (PHY) specifications: Amendment 4: Further Higher Data Rate Extension in the 2.4 GHz Band," IEEE Computer Society. Published by The Institute of Electrical and Electronics Engineers, Inc., Jun. 27, 2003.
IEEE Std 802.16-2001. "Part 16 Air Interface for Fixed Broadband Wireless Access Systems," IEEE Computer Society and the IEEE Microwave Theory and Techniques Society, Published by The Institute of Electrical and Electronics Engineers, Inc., Apr. 8, 2002.
International Search Report—PCT/US03/016208. International Search Authority—US, Nov. 6, 2003.
Kannangara, et al., "Analysis of an Adaptive Wideband Duplexer with Double-Loop Cancellation," IEEE Transactions on Vehicular Technology, vol. 56, No. 4, Jul. 2007, pp. 1971-1982.
Kutlu, et al., "Performance Analysis of MAC Protocols for Wireless Control Area Network," 1996 IEEE, pp. 494-499.

Notification of the First Office Action from Chinese Patent Office dates Sep. 8, 2006 for the corresponding Chinese patent application No. 200380105267.7.

Official communication issued from the European Patent Office dated Aug. 7, 2007 for the corresponding European patent application No. 03759271.4-2412.

Official communication issued from the European Patent Office dated Dec. 19, 2006 for the corresponding European patent application No. 03759271.4-2412.

Second Office Action issued from the Chinese Patent Office on Jul. 20, 2007 in connection with corresponding Chinese application No. 200380101286.2.

Specification for2.3 GHz Band Portable Internet Service—Physical & Medium Access Control Layer, TTAS.KO-06.0082/R1, Dec. 2005.

Third Office Action issued from the Patent Office of People's Republic of China dated Jan. 4, 2008 in corresponding Chinese Patent Application No. 200380101286.2.

U.S. PTO Office Action mailed on Apr. 17, 2007 for the corresponding parent U.S. Appl. No. 11/339,838, now U.S. Patent No. 7,230,935.

U.S. PTO Office Action mailed on Jan. 24, 2007 for the corresponding parent U.S. Appl. No. 11/339,838, now U.S. Patent No. 7,230,935.

U.S. PTO Office Action mailed on Nov. 21, 2006 for the corresponding parent U.S. Appl. No. 11/339,838, now U.S. Patent No. 7,230,935.

U.S. PTO Office Action mailed on Nov. 6, 2006 for the corresponding parent U.S. Appl. No. 11/339,838, now U.S. Patent No. 7,230,935.

Translation of Office Action in Japanese application 2004-544751, corresponding to U.S. Appl. No. 10/531,078, Dated Oct. 16, 2009.

Translation of Office Action in Japanese application 2004-565505, corresponding to U.S. Appl. No. 10/563,471, Dated Sep. 9, 2009.

Translation of Office Action in Japanese application 2004-553510, corresponding to U.S. Appl. No. 10/533,589, Dated Nov. 26, 2009.

Translation of Office Action in Japanese application 2004-565505, corresponding to U.S. Appl. No. 10/563,471, Dated Mar. 26, 2010.

IEEE Computer Society and the IEEE Microwave Theory and Techniques Society: "Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands," IEEE P802.16e/D12, New York, USA, Oct. 14, 2005.

Office Action English translation dated Jul. 4, 2008 issued from Chinese Patent Office for Application No. 03814391.7.

Office Action English translation dated Jun. 29, 2009 issued from Japanese Patent Office for Application No. 2004-541532.

Translation of Office Action in Japanese application 2004-515701, corresponding to U.S. Appl. No. 10/516,327, Dated May 25, 2010.

Translation of Office Action in Japanese application 2004-565505, corresponding to U.S. Appl. No. 10/563,471, Dated Mar. 17, 2010.

Translation of Office Action in Japanese application 2007-513349 corresponding to U.S. Appl. No. 11/546,242, dated Nov. 16, 2010.

Translation of Office Action in Japanese application 2009-503041, corresponding to U.S. Appl. No. 11/730,361, Dated Oct. 26, 2010.

Translation of Office Action in Japanese application 2009-526736 corresponding to U.S. Appl. No. 12/307,801 , dated Jan. 4, 2011.

Translation of Office Action in Korean Application 2008-7026775, corresponding to U.S. Appl. No. 11/730,361, Dated Aug. 30, 2010.

Translation of Office Action in Korean application 2009-7010639, corresponding to U.S. Appl. No. 12/439,018, Dated Nov. 15, 2010.

Dohler, M. et al., "Distributed PHY-Layer Mesh Networks," 14th IEEE 2003 International Symposium on Personal, Indoor and Mobile Radio Communication Proceesings, 2003. PIMRC 2003. The United States of America, IEEE, vol. 3, pp. 2543 to 2547, Sep. 7, 2003, doi: 10.1109/PIMRC.2003.1259184.

Fujii, T. et al., "Ad-hoc Cognitive Radio Cooperated with MAC Layer," IEIC Technical Report (Institute of Electronics, Information and Communication Engineers), Japan, Institute of Electronics, Information and Communication Engineers (IEIC), May 4, 2005, vol. 105 (36), pp. 59 to 66.

Zimmerman, E. et al., "On the Performance of Cooperative Diversity Protocols in Practical Wireless Systems," IEEE 58th Vehicular Technology Conference, 2003, The United States of America, IEEE, Oct. 6, 2003, vol. 4, pp. 2212 to 2216.

\* cited by examiner

WIRELESS LOCAL AREA NETWORK REPEATER

CROSS-REFERENCE TO RELATED APPLICATION

This application is related to, and claims priority from, a provisional application filed on Jun. 21, 2002, entitled REPEATER FOR WLAN and identified by Ser. No. 60/390,093.

FIELD OF THE INVENTION

The present invention relates generally to wireless communications and more specifically to a repeater for increasing the coverage of wireless networks.

BACKGROUND OF THE INVENTION

Several standard protocols for wireless local area networks, commonly referred to as WLANs, are becoming popular. These include protocols such as 802.11 (as set forth in the 802.11 wireless standards), home RF, and Bluetooth. The standard wireless protocol with the most commercial success to date is the 802.11b protocol.

While the specifications of products utilizing the above standard wireless protocols commonly indicate data rates on the order of, for example, 11 MBPS and ranges on the order of, for example, 100 meters, these performance levels are rarely, if ever, realized. This lack of performance is due to attenuation of the radiation paths of RF signals, which are typically in the range of 2.4 GHz, in an indoor environment Base to receiver ranges are generally less than the coverage range required in a typical home, and may be as little as 10 to 15 meters. Further, in structures that have split floor plans, such as ranch style or two story homes, or that are constructed of materials that attenuate RF signals, areas in which wireless coverage is needed may be physically separated by distances outside of the range of, for example, an 802.11 protocol based system. Finally, the data rates of the above standard wireless protocols are dependent on the signal strength. As distances in the area of coverage increase, wireless system performance typically decreases.

One way to increase the range of wireless systems is by the use of repeaters. This is a common practice in the mobile wireless industry. One significant complication is that the system receivers and transmitters operate at the same frequency for a WLAN utilizing 802.11 or 802.16 WMAN wireless protocol. Such operation is commonly referred to as time division duplexing. This operation is significantly different than the operation of many cellular repeater systems, such as those systems based on IS-136, IS-95 or IS-2000 standards, where the receive and transmit bands are separated by a duplexing frequency offset. Frequency division duplexing makes the repeater operation easier than in the case where the receiver and transmitter channels are on the same frequency.

There are, however, cellular mobile systems that separate the receive and transmit channels by time rather than by frequency. These systems utilize scheduled times for specific uplink/downlink transmissions. Repeaters for these systems are easily built, as the transmission and reception times are well known and are broadcast by a base station. Receivers and transmitters for these systems may be isolated by any number of means including physical separation, antenna patterns, or polarization isolation.

The random packet nature of the WLAN protocols provides no defined receive and transmit periods. The packets from each wireless network node are spontaneously generated and transmitted and are not temporally predictable. A protocol referred to as a collision avoidance and random back-off protocol is used to avoid two units transmitting their packets at the same time. For 802.11 standard protocol, this is referred to as the distributed coordination function (DCF).

WLAN repeaters have unique constraints due to the above spontaneous transmission capabilities and therefore require a unique solution. Another unique requirement is that, since these repeaters use the same frequency for receive and transmit, some form of isolation must exist between the receiver and transmitter of the receivers. While existing CDMA systems employ directional antennas and physical separation of the receive and transmit antennas to achieve this isolation, such techniques are not practical for WLAN repeaters in many operating environments such as in the home where lengthy cabling is not desirable or may be too costly.

SUMMARY OF THE INVENTION

The wireless repeater of the present invention solves the above-discussed issues regarding spontaneous transmission and transceiver isolation through the use of a unique frequency detection and translation method. The wireless repeater enables two WLAN units to communicate by translating the packets from a first frequency channel used by one device to a second frequency channel used by a second device. The direction of the conversion from the first frequency channel to the second frequency channel versus conversion from the second frequency channel to the first frequency channel is dependent upon real time configuration. The repeater monitors both channels for transmissions and, when a transmission on a channel is detected, translates the received signal to the other channel, where it is transmitted.

The wireless repeater of the present invention therefore enables high-speed communication among transmitters and receivers that might otherwise be isolated from one another in a conventional WLAN environment. Further, the repeater is small and relatively inexpensive, and avoids spontaneous transmission by monitoring and responding in reaction to the transmissions.

DETAILED DESCRIPTION OF THE INVENTION

Figure 1:
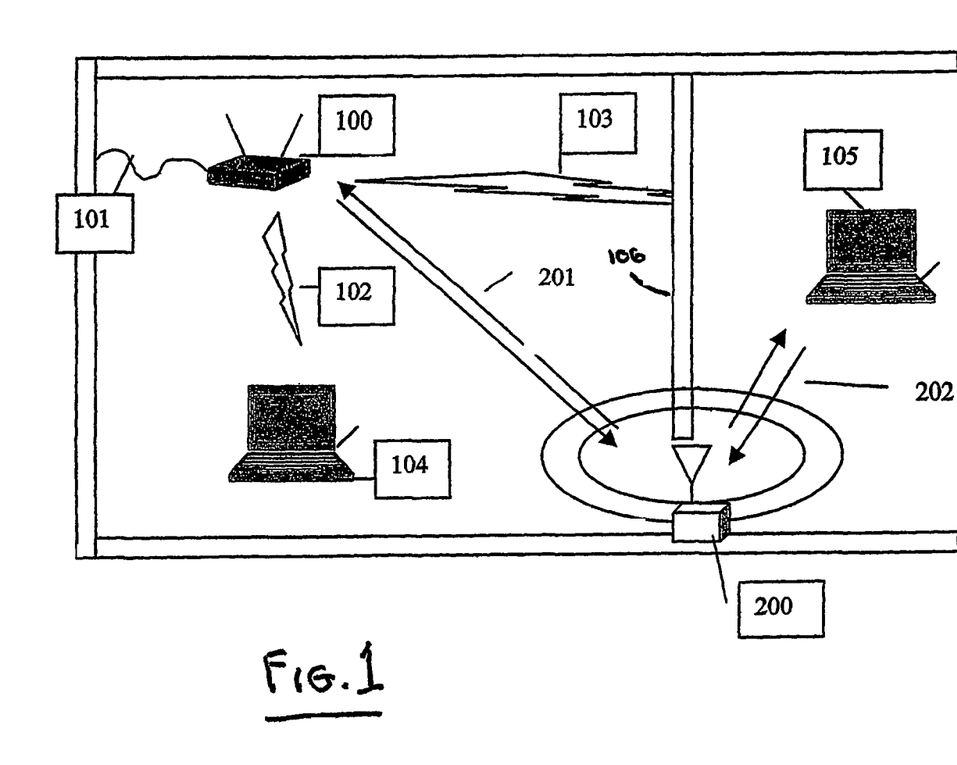
FIG. 1 is a block diagram of a wireless network including a WLAN repeater according to a preferred embodiment of the present invention.

Referring now to FIG. 1, a wide area connection 101, which could be an Ethernet connection, a T1 line, a wideband wireless connection or any other electrical connection providing data communication, is connected to a wireless gateway, or access point, 100. The wireless gateway 100 sends RF signals, such as IEEE 802.11 packets or signals based upon Bluetooth, Hyperlan, or other wireless communication protocols, to client devices 104, 105, which may be personal computers, personal digital assistants, or any other device capable of communicating with other like devices through one of the above mentioned wireless protocols. Respective propagation, or RP, paths to each of the client devices are shown as 102, 103.

While the signal carried over RF path 102 is of sufficient strength to maintain high-speed data packet communications between the client device 104 and the wireless gateway 100, the signals carried over the RF path 103 and intended for the client device 105 would be attenuated when passing through a structural barrier such as a wall 106 to a point where few, if any, data packets are received in either direction if not for a wireless repeater 200, the structure and operation of which will now be described.

To enhance the coverage and/or communication data rate to the client device 105, the wireless repeater 200 receives packets transmitted on a first frequency channel 201 from the wireless gateway 100. The wireless repeater 200, which may have dimensions of, for example, 2.5"×3.5"×0.5", and which preferably is capable of being plugged into a standard electrical outlet and operating on 110 V AC power, detects the presence of a packet on the first frequency channel 201, receives the packet and re-transmits the packet with more power on a second frequency channel 202. Unlike conventional WLAN operating protocols, the client device 105 operates on the second frequency channel, even though the wireless gateway 100 operates on the first frequency channel. To perform the return packet operation, the wireless repeater 200 detects the presence of a transmitted packet on the second frequency channel 202 from the client device 105, receives the packet on the second frequency channel 202, and re-transmits the packet on the first frequency channel 201. The wireless gateway 100 then receives the packet on the first frequency channel 201. In this way, the wireless repeater 200 is capable of simultaneously receiving and transmitting signals as well as extending the coverage and performance of the wireless gateway 100 to the client device 105.

It should also be appreciated that the wireless repeater 200 may be utilized in a similar manner to enhance communications in a peer-to-peer network from one client device to another client device. When there are many units that are isolated form one another, the wireless repeater 200 acts as a wireless hub allowing two different groups of units to communicate where standard RF propagation and coverage would otherwise not enable the units to communicate.

Figure 2:
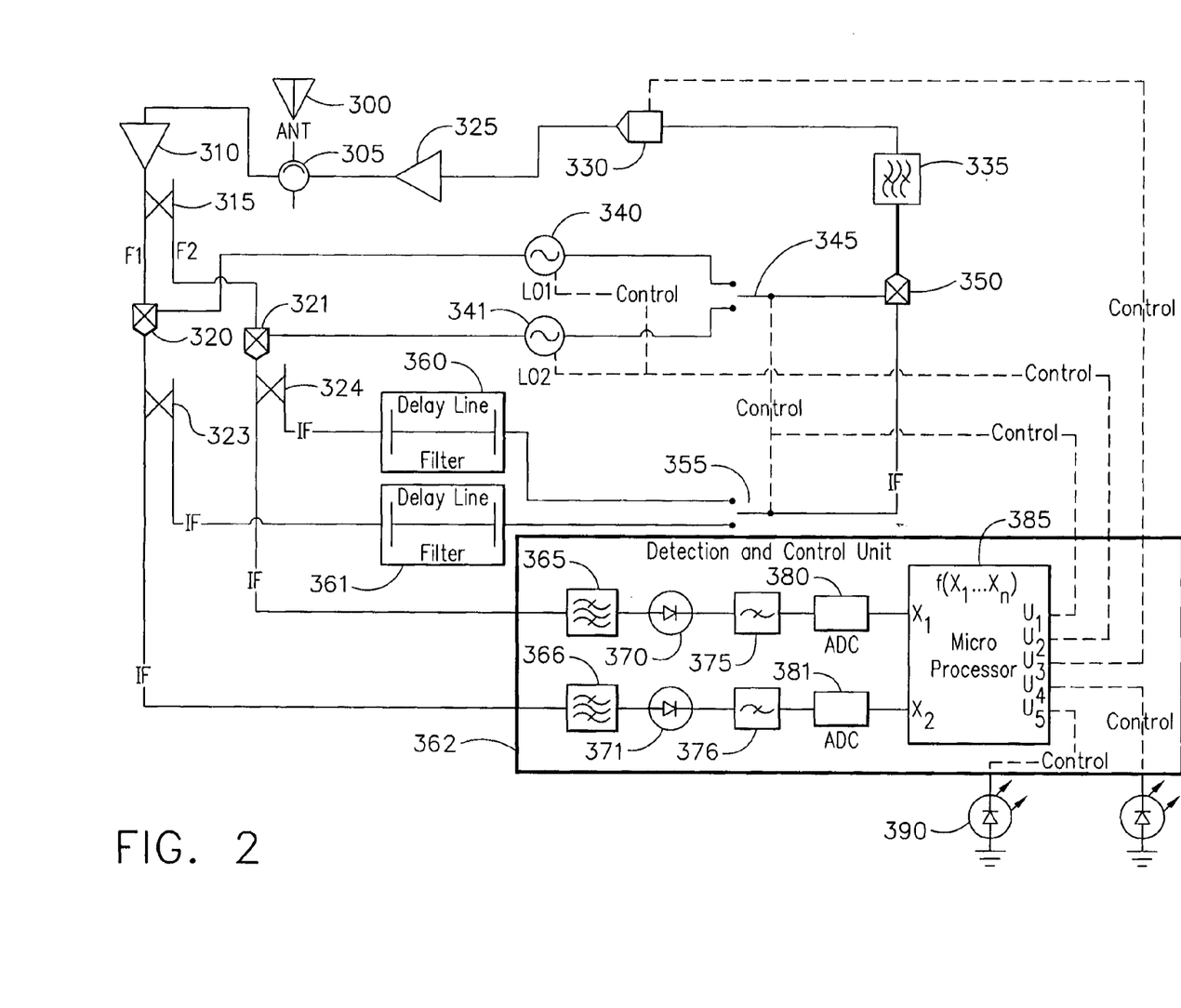
FIG. 2 is a detailed block diagram of the repeater shown in FIG. 2.

FIG. 2 shows the wireless repeater 200 in more detail. Key features of the wireless repeater 200 are its ability receive a signal and translate the frequency of the received signal from a first bi-directional frequency to a second bi-directional frequency with very little distortion of the signal. This is made possible by fast signal detection and delay of the received signal long enough to determine proper control actions.

Radio waves propagate from various wireless devices such as the client devices 104, 105 in FIG. 1 and become incident to antenna 300, which, as is known to those of ordinary skill in the art, is an electromagnetic to voltage transducer. In a preferred embodiment this could be a single omni directional antenna tuned and matched to the frequencies of interest. Other embodiments could include, but are not limited to, directional planar antennas, dual antenna elements, polarized antenna elements and directional arrays.

The antenna 300 shown in FIG. 2 transforms received radio waves to a voltage signal and feeds the voltage signal to an isolator 305. Alternatively, the isolator may not be included depending upon the type of antenna configuration utilized. Two such antenna configurations will be described below. The isolator 305 allows a signal to pass from the antenna 300 to a Low Noise Amplifier (LNA) 310 and from a power amplifier 325 to the antenna 300, but blocks or isolates the LNA 310 from the power amplifier 325. Other embodiments of the isolator 305 could include, but are not limited to, circulators, directional couplers, splitters, and switches. For instance, switches may be used with the dual directional antenna configuration to be described in FIG. 4. A signal received and transformed by the antenna 300 that passes through the isolator 305 is fed to the LNA 310, which amplifies the signal and sets the noise level at that point. A signal amplified by the LNA 310 is fed to an RF splitter 315, which performs an RF power splitting, or coupling, function on the signal to split the signal into two different paths. The splitter 315 could also be a directional coupler or any device that can separate one signal into two signals.

At this point, one skilled in the art will readily recognize that the antenna 300, the LNA 310 and the RF splitter 315 are the primary components forming a receiver in the repeater 200. Further, one skilled in the art will readily recognize that the antenna 300, the power amplifier 325, the amplifier 330, the filter 335, the switch 345 and the mixer 350 are the primary components forming a transmitter in the repeater 200.

Mixers 320, 321 are frequency conversion devices that mix signals passed from the splitter 315 with signals output from the local oscillators 340, 341 at respective frequencies designated as LO1, LO2 to produce intermediate frequency (IF) or typically lower frequency signals. The local oscillators 340, 341 are tuned to the different frequencies LO1, LO2 such that two different signals at two different frequencies fed from the splitter 315 can be converted to a common IF frequency. For example, if signals at two different frequencies F1=2.412 GHz and F2=2.462 are output from the splitter 315 to the mixers 320, 321, respectively, and assuming the mixer 320 is performing a low side mixing function and the mixer 321 is performing a high side mixing function, then with the local oscillator 340 tuned to LO1=2.342 GHz and the local oscillator 341 tuned to LO2=2.532 GHz and providing inputs to the mixers 320, 321, respectively, the signals output from mixers 320, 321 would each have their frequencies transformed to an IF of 70 MHz.

The splitters 323, 324, which operate the same as the splitter 315 described above, separate the IF signals output from the respective mixers 320, 321 into two different paths. One path from each of the splitters 323, 324 goes to filters 360, 361, respectively, while the other path from each of the splitters 323, 324 goes to filters 365, 366, respectively.

The filters 360, 361, which are preferably band pass filters with delays, remove all outputs from the mixing operation except the desired frequency components. Preferably, the filters 360, 361 have a sufficient time delay such that the detection and control unit 362 can detect which of the two RF frequencies is present and perform control functions described below prior to the signals being available at the output of the filters 360, 361, as detectors 370, 371 are in parallel with the delay filters 360, 361. Methods of delaying electrical signals are well known to those of ordinary skill in the art, and include but are not limited to Surface Acoustic Wave (SAW) devices and the like. However, if it is acceptable, to truncate a portion of the first part of the RF signal, then the filters 360, 361 would not need specified delays.

One skilled in the art will readily recognize that the mixers 320, 321, the splitters 323, 324 and the filters 360, 361 are the primary components forming a frequency converter in the repeater 200.

The filters 365, 366 in the detection and control unit 362 also perform the same type of band pass filtering as the filters 360, 361. The main difference is that the filters 365, 366 are preferably fast filters without specified long time delays. Additionally, the filters 365, 366 preferably do not require the same level of filtering performance as the filters 360, 361, although one skilled in the art would recognize that varying filter performance within the confines of performing the filtering objective is a design choice. One skilled in the art would also recognize that filters or devices other than band pass filters might be used to perform the above discussed band pass functions.

Power detectors 370, 371 are simple power detection devices that detect if a signal is present on either of the respective frequencies F1, F2 and provide a proportional voltage output if the signal is present. Many types of analog detectors that perform this function may be used. For example, such detectors could include, but are not limited to, diode detectors. Such diode detection could be performed at RF, IF or base band. Detectors providing higher performance than simple power detectors may be used as well. These detectors may be implemented as matched filtering at RF or IF using SAW devices, and matched filtering or correlation at base band after analog to digital conversion. The power detectors 370, 371 are utilized to determine the presence of a wireless transmission on one of the two IF channels by comparing signals on the two IF channels with a threshold. Such a threshold could be predetermined or calculated based on monitoring the channels over time to establish a noise floor.

Further, the power detectors 370, 371 may be used to determine start and stop times of a detected transmission. The proportional voltage output by one of the power detectors 370, 371 in response to signal detection will be used by the microprocessor 385 to control the retransmission of the signal as is described below. One of ordinary skill in the art will recognize that the power detection can be placed earlier or later in the signal processing path, as it is possible to detect signals so that the retransmission process may be switched on or off. Further, one of ordinary skill in the art will recognize that techniques for determining or limiting transmission time can be employed, including but not limited to placing a time limit on retransmission using a timer.

The filters 375, 376 are low pass filters and preferably have narrower bandwidths than the filters 365, 366. The filters 375, 376 are required to remove the high frequency components that remain after signal detection in the power detectors 370, 371 and to provide an increase in signal to noise ratio by providing processing gain by reducing the detection signal bandwidth. The signals output from low pass filters 375, 376 are input to conventional analog to digital converters 380, 381.

After the analog to digital converters 380, 381 convert the analog signal representing the detected power of the RF signals to digital signals in a manner well known to those skilled in the art, the resulting digital signals are sent to the microprocessor 385. The microprocessor 385, which can also be described as a logic state machine, digital signal processor, or other digital processing and control device, can be programmed to implement all necessary control algorithms to, with a high probability of certainty, detect the presence of either F1 or F2 and initiate appropriate control functions.

Alternatively, it should be noted that comparator detectors (not shown) with adjustable threshold controls may be used in place of the analog to digital converters 380, 381 and the microprocessor 385. Further, the control outputs of the microprocessor 385 could be alternatively connected directly to digital gates to control the switching where input to these gates is taken directly from comparator detector outputs. Further input to the digital logic may come from the microprocessor 385 to allow for override control to the settings provided from the comparator detector's output In this case the microprocessor (385) would continue to control the display functions; however, it is likely the control of the variable gain amplifier 330 would be controlled directly from the power detectors 370, 371 using analog signals.

Feedback to a user can be controlled by the microprocessor 385 via an indicator 390 which could be, but is not limited to, a series of light emitting diodes. Feedback to the user could be an indication that the wireless repeater 200 is in an acceptable location such that either or both frequencies from the wireless access point 100 and the client device 105 can be detected, or that power is supplied to the wireless repeater 200.

Once either of the frequencies F1, F2 is detected, the microprocessor 385 controls switches 345, 355. The switch 355 is switched to allow the detected signal, either on F1 or F2, which is at an IF frequency, to be routed to the input of a frequency converter 350, which is another frequency translation device similar to the mixers 320, 321. Additionally, the microprocessor 385 will set the switch 345 to allow a signal from the appropriate one of the local oscillators 340, 341 to be routed to the mixer 350 so that the IF frequency at the input to the frequency converter 350 is translated to the proper frequency at the output thereof.

An example of operation of the wireless repeater 200 will now be described using the frequency in the previous examples: F1=2.412 GHz; F2=2.462 GHzIF=70 MHz; LO1=2.342 GHz; and LO2=2.532 GHz. Assume F1 is detected and is output from the filter 361. The switch 355 is set to receive its input from the filter 361, which is F1 translated to 70 MHz. Since it is desired to retransmit F1 at F2=2.462 GHz, then the switch 345 is connected to the signal from the local oscillator 341. The output of the frequency translator 350 includes two components (LO2−IF) and (LO2+IF). The desired component is LO2−IF or 2.532 GHz− 70 MHz=2.462 GHz. Since the frequency translator 350 produces the sum and difference of switch 345 output and switch 355 output, then a filter 335 is required to remove the undesirable term. In the example above, the undesirable term would be LO2+IF or 2.602 GHZ.

The filter 335 performs the required filtering operations. The same is true if F2 was detected. A sum and difference product will occur, and the filter 335 must filter out the undesirable component. The translated and filtered version of the received signal is applied to the amplifier 330, which is preferably a variable gain amplifier. The amplifier 330 applies a variable amount of gain under control of the microprocessor 385 to make sure that the signal being feed to the amplifier 325 is in the target transmit power range. The amplifier 325 is preferably the final power amplification stage for the transmit signal. It feeds its output to the isolator 305, which then sends the signal to the antenna 300. The signal is then converted back to an electromagnetic field or radio wave by the antenna 300 in a manner well known to those of ordinary skill in the art. This radio wave is a frequency translated and power amplified version of what was received by the antenna 300.

The above descriptions and example assumes frequencies F1 and F2. It is also possible to operate with any frequencies F1 and F2 by moving the frequencies LO1, LO2 of the local oscillators 340, 341 to different defined channels and checking for power detection at those channels. Once the channels are determined, the microprocessor 385 will use those frequencies, and all operations will be performed as described above. Control of the frequencies of the local oscillators 340, 341 can be accomplished by the microprocessor 385 or by user tuning. In the case of user tuning for the control of the selected frequencies, the repeater would have a set of switches (rotary or other) that a technician would set at the time of installation to specify the frequencies of operation.

Those of ordinary skill in the art will recognize that the point at which the input signal is down converted from RF to a digital signal may be altered such that more or fewer functions are performed in the RF domain or the digital domain. Further, multiple devices such as the wireless gateway (base unit) 100 or client devices 104, 105 may be utilized in the present invention. The repeater 200 will detect and retransmit signals from any of these devices. The devices 100, 104 or 105 communicate with each other within the protocol of a system (such as 802.11) that provides that the desired recipient of the retransmitted signal is identified. Thus, the repeater 200 may serve many master devices.

Figure 3:
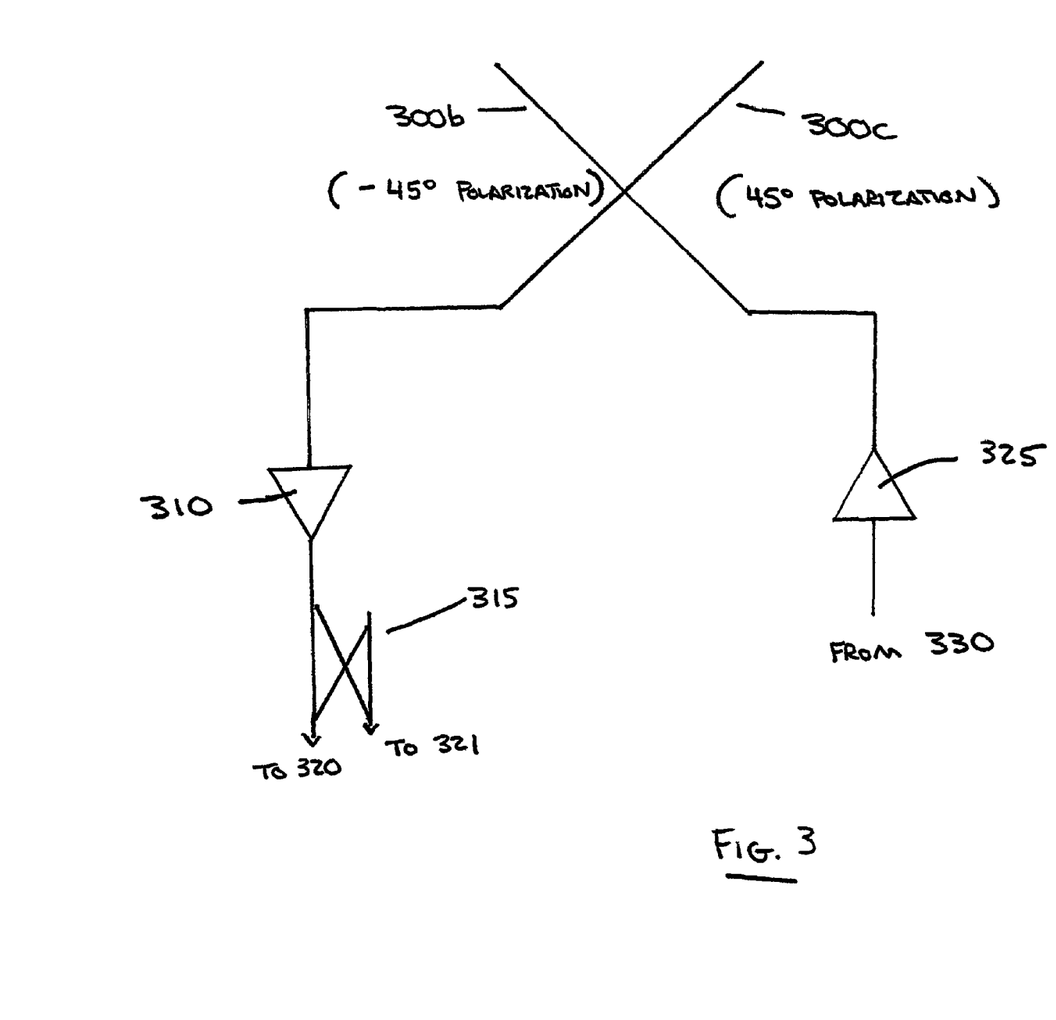
FIG. 3 is a detailed block diagram of an alternative front end for the repeater shown in FIG. 2 utilizing dual orthogonally polarized antennas.

Referring to FIG. 3, in which components identical to those in FIG. 2 are identified by the same reference numbers used in FIG. 2, an alternative embodiment utilizing dual orthogonally, or cross, polarized antennas is shown. In this case, two antennas 300b, 300c replace the single antenna 300 and isolator 305 of FIG. 2. In this embodiment, one of the cross-polarized antennas 300b is connected to the power amplifier 355. The other antenna 300c, of opposite polarization, is connected to the LNA 310. The cross-polarized antennas 300b, 300c may be co-located or separated by some distance as allowed by the packaging of the repeater 200. The orthogonal or cross polarization allows for isolation of the transmitted signals from the PA 325 from the received signals into the LNA 310, and enables performance of a similar function to that performed by the isolator 305 in FIG. 2.

Figure 4:
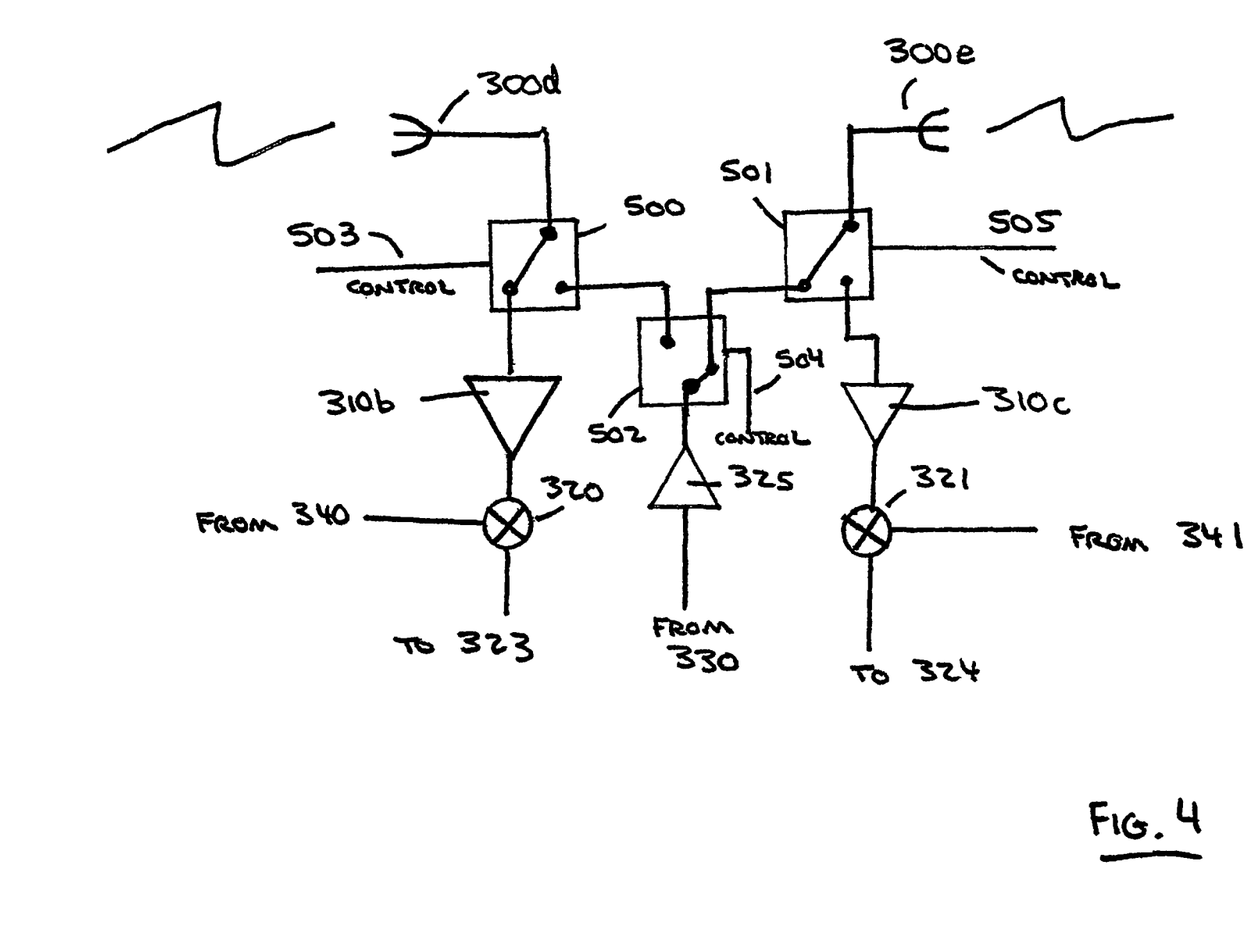
FIG. 4 us a detailed block diagram of an alternative front end for the repeater shown is FIG. 2 utilizing dual directional antennas and switches.

Referring to FIG. 4, in which components identical to those in FIG. 2 are identified by the same reference numbers used in FIG. 2, an alternative embodiment utilizing dual directional antennas is shown. This embodiment substitutes two high gain directional antennas 300d, 300e, and switches 500, 501, 502 for the antenna 300 and isolator 305 in FIG. 2. This embodiment differs from the previously described embodiments in that it allows the repeater 200 to be used in the middle of a point-to-point time and to benefit from the use of the high gain directional antennas 300d, 300e. For this embodiment, it is required that the repeater 200 be able to receive or transmit from each of the two directional antennas 300d, 300e due to the spatial selectivity of each of the antennas.

In this configuration, the switches 500, 501 are nominally set to receive more by control lines 503, 505 respectively, such that LNAs 310b, 310c are connected to the directional antennas 300d, 300e, respectively. The LNAs 310b, 310c are connected to the mixers 320, 321 respectively. The operation of the detection and IF delay process is identical to that discussed in connection with FIG. 2. Once a signal from an antenna (300d for example) is detected, the control lines 503, 505 are set to disconnect the LNA 310c from the directional antenna 300e on which the signal is not present, and to connect the antenna 300e to the power amplifier 325 for the duration of the transmission. The control lines 503, 504, 505 are for setting switches 500, 501, 502 respectively and are coupled to the microprocessor 385, or to other digital control logic as previously described.

The invention is described herein in detail with particular reference to presently preferred embodiments. However, it will be understood that variations and modifications can be effected within the scope and spirit of the invention.

What is claimed is:

1. An apparatus for facilitating wireless communication in a network between a first communication device and a second communication device, said network including at least two bi-directional communication frequencies each using a time division duplex format of data transmission, comprising:
   a receiver to receive signals on said at least two bi-directional communication frequencies, the receiver including a signal splitter configured to split the received signal;
   a frequency converter to convert a signal present on one of said bi-directional frequencies to a converted signal on the other of said bi-directional frequencies;
   a first additional splitter in communication with a first output of the signal splitter and a second additional splitter in communication with a second output of the signal splitter;
   a signal detector including a first detector in communication with an output of the first additional splitter and a second detector in communication with an output of the second additional splitter, the signal detector configured to determine if the received signals include a signal on at least one of said at least two bi-directional frequencies;
   a delay circuit including a first delay in communication with a different output of the first additional splitter and a second delay in communication with a different output of the second additional splitter; and
   a transmitter to transmit the converted signal on the other of said bi-directional frequencies.

2. The apparatus of claim 1, wherein the received signals comprise RF (radiofrequency) signals and wherein the apparatus further comprises one or more downconverter circuits to convert RF signals to IF (intermediate frequency) signals, and wherein said signal detector operates at one or more intermediate frequencies.

3. The apparatus of claim 1, wherein the received signals comprise RF (radiofrequency) signals, and wherein said signal detector is for detecting the signal at a radio frequency.

4. The apparatus of claim 1, further comprising a first antenna and a second antenna, wherein the receiver is configured to receive the signals on said at least two bi-directional frequencies simultaneously a from the first antenna, and
   wherein the transmitter is configured to transmit the converted signal on the other of said bi-directional frequencies using the second antenna.

5. The apparatus of claim 4, wherein said first and second antennas have respective polarizations that are largely orthogonal to one another.

6. The apparatus of claim 1, further comprising an antenna and an isolator, and wherein said receiver and said transmitter both use the antenna, and wherein the antenna is connected to said receiver and said transmitter through the isolator.

7. The apparatus of claim 1, further comprising a first directional antenna and a second directional antenna, wherein said receiver further includes first and second single frequency channel receivers configured to receive a first frequency channel and a second frequency channel respectively, wherein the transmitter comprises a transmitter for the first frequency channel and a transmitter for the second frequency channel, and wherein the first single frequency channel receiver and the transmitter for the first frequency channel share the first directional antenna, and the second single frequency channel receiver and the transmitter for the second frequency channel share the second directional antenna.

8. The apparatus of claim 1, wherein the delay circuit is configured to reduce truncation of the received signals to be transmitted to acceptable levels by compensating for detection delay during receipt of the signals by said receiver.

9. The apparatus of claim 8, further comprising a first mixer and a first local oscillator, said first mixer including a first input coupled to the first output of said signal splitter and a second input coupled to an output of said first local oscillator and an output in communication with the first additional splitter, and further comprising a second mixer and a second local oscillator, said second mixer including a first input coupled to the second output of the signal splitter and a second input coupled to an output of the second local oscillator and an output in communication with the second additional splitter.

10. The apparatus of claim 9, wherein the first additional splitter and the second additional splitter are intermediate frequency splitters.

11. The apparatus of claim 10, wherein said first detector and said second detector are each configured to detect the presence of the signal on one of said bi-directional frequencies, and wherein an output of said first detector and said second detector controls selection of one of two associated intermediate frequencies for transmission of the converted signal by said transmitter upon detection of the signal on at least one of the bi-direction frequencies.

12. The apparatus of claim 10, further comprising:
a single switch configured to couple the first delay or the second delay to a frequency converter to change a frequency of a coupled intermediate frequency signal to the other of said the bi-directional frequencies prior to transmission.

13. The apparatus of claim 9, wherein said first detector and said second detector are configured to determine a beginning or ending of the received signals.

14. The apparatus of claim 13, wherein said first detector and said second detector are configured to compare the received signals to a threshold value to detect the signal.

15. The apparatus of claim 1, wherein the apparatus comprises a repeater.

16. The apparatus of claim 15, further including a circulator configured to receive a signal information packet from said receiver on said first bi-directional communication frequency and further configured to transmit the signal information packet using said transmitter on said second bi-directional communication frequency.

17. The apparatus of claim 16, wherein said signal detector includes a power indicator.

18. The apparatus of claim 1, further comprising an indicator to provide visual indication when received signal levels from at least one of the first and second communication devices are sufficient for communication between at least one of the first and second communication devices and the apparatus.

19. The apparatus of claim 1, where the apparatus is configured to utilize 802.11 protocol or a derivative thereof.

20. The apparatus of claim 1, further comprising a demodulator to demodulate a signal detect by the signal detector during re-transmission thereof.

21. A wireless local area network configured to communicate using at least first and second bi-directional communication frequencies, comprising:
a first communication device configured to transmit and receive data on said first and said second bi-directional communication frequencies, wherein said first communication device is configured to transmit and receive data using a time division duplex format on either of said at least first or second bi-directional communication frequencies,
a second communication device configured to transmit and receive data on said first and said second bi-directional communication frequencies, wherein said second communication device is configured to transmit and receive data using a time division duplex format on either of said at least first or second bi-directional communication frequencies,
a repeater configured to provide a communication link between said first and said second communication devices, said repeater including a receiver configured to receive a signal on either of said first and said second bi-directional communication frequencies, the receiver including a signal splitter configured to split the received signal, a first additional splitter in communication with a first output of the signal splitter and a second additional splitter in communication with a second output of the signal splitter, a signal detector operatively coupled to the receiver configured to determine if the signal is present on one of said at least two bi-directional frequencies, the signal detector including a first detector in communication with an output of the first additional splitter and a second detector in communication with an output of the second additional splitter, a frequency converter operatively coupled to the signal detector for converting the signal present on the one of said bi-directional frequencies to a converted signal on the other of said bi-directional frequencies, a delay circuit including a first delay in communication with a different output of the first additional splitter and a second delay in communication with a different output of the second additional splitter, and a transmitter that transmits the converted signal on the other of said bi-directional frequencies.

22. The wireless local area network of claim 21, wherein at least one of said first or said second communication devices is configured to connect to a wired network and serves as a wireless gateway.

23. The wireless local area network of claim 21, wherein the first communication device comprises a base unit, and wherein the second communication device comprises a client unit.

24. The wireless local area network of claim 21, wherein the repeater is configured to determine a duration of transmission of a detected signal on one of the at least first and second bi-directional communication frequencies, wherein the duration is based at least in part on a time duration counter started when the detected signal is detected.

25. The wireless local area network of claim 21, where said repeater further includes a first antenna and a second antenna, wherein said receiver is connected to the first antenna and said transmitter is connected to the second antenna, and wherein the first and second antennas have largely orthogonal polarizations.

26. The wireless local area network of claim 21 where said receiver is connected to at least two switches, each of which is coupled to at least two directional antennas respectively and to an additional switch, which in turn is coupled to at least one transmitter.

27. A method of repeating signals comprising:
receiving received signals on a receiver, wherein the received signals include signals on a first frequency and signals on a second frequency;
splitting the received signals to produce a first output and a second output;
splitting the first output to produce a first detection output and a first delay output;
splitting the second output to produce a second detection output and a second delay output;
detecting whether the received signals include a signal on the first frequency or a signal on the second frequency;

based on detecting whether the received signals include a signal on the first frequency or a signal on the second frequency, transmitting a delayed signal at the other of the first frequency or the second frequency.

28. The method of claim 27, wherein the received signals are RF signals, and wherein the method further comprises downconverting the received signals to one or more intermediate frequencies (IFs) prior to detecting whether the received signals include a signal on the first frequency or a signal on the second frequency.

29. The method of claim 28, further comprising upconverting a delayed IF signal to an RF signal prior to transmitting the delayed signal at the other of the first frequency or the second frequency.

30. An apparatus comprising:
- means for receiving signals on said at least two bi-directional communication frequencies, the means for receiving signals comprising means for splitting the received signals;
- means for converting a signal present on one of said bi-directional frequencies to a converted signal on the other of said bi-directional frequencies;
- a first additional means for splitting signals in communication with a first output of the means for splitting the received signal;
- a second additional means for splitting signals in communication with a second output of the means for splitting the received signal;
- signal detecting means including a first detecting means in communication with an output of the first additional means for splitting signals and a second detecting means in communication with an output of the second additional means for splitting signals, the signal detecting means for determining if the received signals include a signal on at least one of said at least two bi-directional frequencies;
- delay means including a first delay means in communication with a different output of the first additional means for splitting signals and a second delay means in communication with a different output of the second additional means for splitting signals; and
- means for transmitting the converted signal on the other of said bi-directional frequencies.

* * * * *